United States Patent
Polykarpov et al.

(10) Patent No.: US 6,489,087 B2
(45) Date of Patent: Dec. 3, 2002

(54) METHOD FOR REPRODUCING IMAGES

(75) Inventors: Alexander Y. Polykarpov, Mason, OH (US); Joseph C. Camillus, Centerville, OH (US)

(73) Assignee: Cycolor, Inc., Miamisburg, OH (US)

( * ) Notice: Subject to any disclaimer, the term of this patent is extended or adjusted under 35 U.S.C. 154(b) by 0 days.

(21) Appl. No.: 09/849,033

(22) Filed: May 4, 2001

(65) Prior Publication Data

US 2002/0004184 A1 Jan. 10, 2002

Related U.S. Application Data

(60) Provisional application No. 60/201,788, filed on May 4, 2000.

(51) Int. Cl.$^7$ .................................................. G03C 7/46
(52) U.S. Cl. ........................................ 430/362; 430/404
(58) Field of Search ................................. 430/404, 362

(56) References Cited

U.S. PATENT DOCUMENTS

| | | | |
|---|---|---|---|
| 4,279,945 A | 7/1981 | Audran et al. | 427/130 |
| 4,399,209 A | 8/1983 | Sanders et al. | 430/138 |
| 4,416,966 A | 11/1983 | Sanders et al. | 430/138 |
| 4,440,846 A | 4/1984 | Sanders et al. | 430/138 |
| 4,736,215 A | 4/1988 | Hudspeth et al. | 354/21 |
| 4,766,050 A | 8/1988 | Jerry | 430/138 |
| 5,130,745 A | 7/1992 | Cloutier et al. | 355/40 |
| 5,217,804 A | 6/1993 | James et al. | 428/329 |
| 5,218,455 A | 6/1993 | Kristy | 358/403 |
| 5,231,506 A | 7/1993 | Manico et al. | 358/302 |
| 5,252,444 A | 10/1993 | Yamada et al. | 430/503 |
| 5,264,683 A | 11/1993 | Yoshikawa | 235/375 |
| 5,270,839 A | 12/1993 | Parulski et al. | 358/474 |
| 5,321,751 A | 6/1994 | Ray et al. | 380/23 |
| 5,395,743 A | 3/1995 | Brick et al. | 430/496 |
| 5,555,044 A | 9/1996 | Gandola et al. | 354/106 |
| 5,703,673 A | 12/1997 | Tokuda | 355/40 |
| 5,715,034 A | 2/1998 | Yamamoto | 355/40 |
| 5,729,326 A | 3/1998 | Yamada | 355/40 |
| 5,760,386 A | 6/1998 | Ward | 235/493 |
| 5,783,353 A | 7/1998 | Camillus et al. | 430/138 |
| 5,790,276 A | 8/1998 | Stephenson, III | 358/487 |
| 5,815,244 A | 9/1998 | Tokuda | 355/41 |
| 6,080,520 A * | 6/2000 | Polykarpov | 430/138 |

FOREIGN PATENT DOCUMENTS

| | | |
|---|---|---|
| WO | 00/72091 | 11/2000 |

* cited by examiner

*Primary Examiner*—Hoa Van Le
(74) *Attorney, Agent, or Firm*—Thompson Hine LLP

(57) ABSTRACT

A method for reproducing an image from a photoprint is disclosed. This aspect of the present invention comprises: providing a photoprint comprising an imaging media and a data storage medium; imaging the imaging media to produce an image on an image side of the media; encoding the data storage medium with data corresponding to the image; reading the data from the data storage medium corresponding to the image; and reproducing the image based on the data read from the data storage medium.

20 Claims, No Drawings

US 6,489,087 B2

METHOD FOR REPRODUCING IMAGES

CROSS-REFERENCE TO RELATED APPLICATION

This application claims priority of U.S. Provisional Application Serial No. 60/201,788 filed May 4, 2000.

FIELD OF THE INVENTION

The present invention relates to a method for reproducing images and, in particular, to a method for reproducing images from a photographic print wherein the photographic print includes digital information useful in producing a reproduction of the image on the photographic print.

BACKGROUND OF THE INVENTION

Methods typically utilized for generating reproductions of consumer-generated still photographic prints, such as images captured on a roll of 35 mm color film, involve identification of the appropriate negative, submission of the negative to a photographic finisher where the image on the negative is projected onto light-sensitive print paper and chemically developed into hard copy print. Reproductions can also be generated from digital images captured either with a high resolution color digital camera or during the photographic processing of a color photographic film. Generating a photographic print reproduction of a digitally stored image involves locating the stored image from a compact disc or other storage media, retrieving the image and reproducing the image on a high quality color printer or other output device.

Color photographic print reproductions can also be generated by scanning the photographic print itself to generate a digitized image of the photographic print which can then be stored to the hard drive, written to a CD or floppy or rewritable disk, or sent directly to a high quality color printer or other output device. Generating a digital image of the photographic print by scanning the photographic print itself results in a loss of resolution and consequently generates a photographic print reproduction of inferior image quality.

Accordingly, prior art methods for generating reproductions of photographic prints suffer from a number of disadvantages. Generating a reproduction of a photographic print from a negative or a digital image stored on a CD requires one to have access to the negative, CD or other storage media and, furthermore, one must be able to locate the desired image which corresponds to the photographic print being reproduced. Negatives, and even in some cases CDs, may become lost or misplaced. Likewise, there are disadvantages associated with generating a reproduction of a photographic print by scanning the photographic print itself. In addition to the loss in resolution inherent in the scanning process, the photographic print itself may have degraded with time or have been damaged, thereby resulting in unacceptable reproduction.

Accordingly, there is a need for a method of generating a reproduction of a photographic print which overcomes the problems associated with the present methods for producing reproductions of photographic prints.

SUMMARY OF THE INVENTION

The present invention provides a method for reproducing images from a photographic material wherein the photographic material includes a data storage medium which can be used to store information relating to the print. Preferably, an electronically readable form, typically a bitmap or digital array, of the image is stored on the data storage medium. Although the electronic image preferably is stored in a digital format to minimize errors or loss of content involved in transforming the image, the electronic image may also be stored in a form suitable for integration into a program or as part of a file storage protocol. The photographic image file may be stored in any of the conventionally used formats such as ".GIF," ".JPG," ".PCX," ".BMP," ".TIF," and the like.

The data storage medium may be a magnetic layer on the photographic print. In accordance with one embodiment of the present invention, the magnetic layer may be a transparent magnetic layer as disclosed in U.S. Pat. No. 5,395,743, incorporated herein by reference, which can be applied over the image side of the photographic print without interfering with the appearance of the print. Alternatively, the data storage medium may be a conventional opaque magnetic layer located in an area where it would not interfere with the image, such as on the back of the photographic print or along a border on the front side of the print.

In one embodiment, a film is processed and the images developed on the film are converted to an electronically readable form and uploaded to a particular electronic Internet address. The Internet address, and perhaps a file location, an access code or other pertinent information, is digitally encoded on the data storage medium on the photographic print. The data storage medium on the photographic print can subsequently be read electronically and automatically direct the user to the corresponding Internet address which contains an electronic image of the photographic print. The electronic version can be transmitted, stored or retrieved. The electronic image may be directly output to a printer for generating additional hard copies of the photographic print. Alternatively, other forms of image presentation are possible, such as displaying the image on a cathode ray tube (CRT), a liquid crystal display (LCD), or a light-emitting diode (LED) display or projecting a visible image onto a tangible surface using one of these display devices.

In another embodiment, a film is developed and the images developed on the film are converted to an electronically readable form and stored on the data storage medium on the photographic print. The electronic image can be retrieved from the data storage medium by any conventional means used for reading magnetic media, such as stripes, films or other forms of magnetic encoding. The retrieved image can be transmitted or stored as described above. In accordance with one aspect of the invention, the image is output to a high resolution color printer. The digital image can be uploaded into a computer where, with the appropriate software, the digitized image can be manipulated by adding text to the image or modifying the appearance of the image. The computer enhanced image can then be transmitted, stored or output to a high resolution color printer for generating additional hard copies of the photographic print with the computer added enhancements.

The method of the present invention allows one to produce a full color reproduction of a photographic print or other image by accessing data stored directly on the print without the need for identifying and locating a corresponding negative, CD ROM, floppy disc, etc. The information necessary to produce a full color reproduction of the photographic print is provided on the data storage medium of the photographic print. The digital information stored on the photographic print is less likely to degrade or deteriorate with time. Reproductions generated by the digital information contained in the data storage medium may be of the same high image quality as the original photographic prints.

Magnetic readers useful in the present invention include manual feed devices wherein the photographic print to be read is manually passed by a magnetic read head or automatic feed devices which move either the read head or the photographic print. In either case movement of the magnetic layer in relation to the read head generates an electronic signal that corresponds to the information contained in the magnetic layer.

DETAILED DESCRIPTION OF THE INVENTION

"Photoprint" as used herein refers to a material capable of being imaged to produce a photograph-like print. Accordingly, the term does not encompass standard film negatives.

In accordance with one aspect of the present invention, a method for reproducing an image from a photoprint is disclosed. This aspect of the present invention comprises the following steps:

a) providing a photoprint comprising an imaging media and a data storage medium;
 b) producing an image on an image side of the media;
 c) encoding the data storage medium with data corresponding to the image;
 d) reading the data from the data storage medium corresponding to the image; and
 e) reproducing the image based on the data read from the data storage medium.

In accordance with another aspect of the present invention, a method for reproducing an image from a photoprint including a photosensitive imaging media and a magnetic storage layer is disclosed. This aspect of the present invention comprises the following, steps:

a) capturing an image in digital form;
 b) image-wise exposing said photosensitive media;
 c) developing said image-wise exposed media to produce a visible image;
 d) recording the digital image in the magnetic storage layer;
 e) reading the digital image in the magnetic storage layer; and
 f) outputting said digital image.

In accordance with the present invention, a method for reproducing an image from a photoprint wherein the photoprint comprises an imaging media and a data storage medium is disclosed. The imaging system may be of the transfer type or self-contained. Transfer systems include Cycolor transfer media, thermal, inkjet, laser, etc. However, self-contained systems are preferred. Examples of self-contained imaging media which may be used include, but are not limited to Polaroid photographic film, Fuji thermoautochrome paper, and Cycolor digital film. In these imaging media, the image forming processes take place within the media structure, either between two sheets of support film or under an overcoating protective layer. The invention will be specifically illustrated with reference to Cycolor digital film, a photosensitive media which employs a developer and microcapsules containing a color precursor and a photohardenable composition. This media is image-wise exposed to actinic radiation to form a latent image in the form of hardened, partially hardened and unhardened microcapsules. By applying pressure to a layer of the microcapsules, the microcapsules rupture and differentially release the color precursor. The released color precursor reacts with a developer material which is provided within the media. The color precursor migrates to the developer to form a full color image. This photographic system is described in more detail in commonly assigned U.S. Pat. Nos. 4,399,209; 4,416,966; 4,440,846; 4,766,050 and 5,783,353, which are incorporated herein by reference.

In accordance with one aspect of the present invention, the imaging media is a self-contained imaging system. In the self-contained imaging system used in accordance with the present invention, the developer and the photohardenable microcapsules are placed in the same imaging layer and the imaging layer is sealed between the two support members to form an integral unit. This sealed format is advantageous because it may prevent oxygen and moisture from permeating into the photohardenable material which may improve film speed and the stability of the image. The term "sealed" as used herein refers to a seal which is designed as a non-temporary seal which results in destruction of the imaging assembly if the seal is broken.

In the self-contained imaging assembly of this embodiment, the previously mentioned first support is transparent and the second support may be transparent or opaque. In the latter case, an image is provided against a white background as viewed through the transparent support and in the former case a transparency is provided in which the image is viewed as transparency preferably using an overhead or slide projector. Sometimes herein the first support may be referred to as the "front" support and the second support may be referred to as the "back" support.

In order to insure that the imaging system is effectively sealed between the supports, a subbing layer may be provided between one of the supports and the imaging layer and an adhesive is provided between the other support and the imaging layer. For optical clarity, the subbing layer will typically be located between the first support and the imaging layer. However, which support receives the subbing layer and which support receives the adhesive is a function of which support is coated with the wet imaging layer composition and which is assembled with the coated and dried imaging layer. The support which is coated with the imaging layer composition (which is typically the front support) will be provided with the subbing layer and the support which is assembled will received the adhesive. In accordance with one embodiment of the invention, the subbing layer is formed from a compound having chemical moieties such as hydroxy groups which will react with and bind to the microcapsules. The sealed self-contained assembly of the present embodiment may include the microcapsule and developer in a single imaging layer or the microcapsules and developer may be present in separate layers.

Images are formed in the present invention in the same manner as described in U.S. Pat. No. 4,440,846. By image-wise exposing this unit to actinic radiation, the microcapsules are differentially hardened into the exposed areas as taught in U.S. Pat. No. 4,440,846. The exposed unit is subjected to pressure to rupture the microcapsules. The ruptured microcapsules release a color-forming agent, where upon the developer material reacts with a color forming agent to form an image. The image form is viewed through the transparent support against an opaque support. Alternatively, an overcoating protective layer can be used in place of a transparent support. Typically, the microcapsules will consist of three sets of microcapsules sensitive respectively to red, green and blue light and containing cyan, magenta and yellow color formers, respectively.

In the self-contained photohardenable imaging assembly, the first transparent support through which the image is viewed can be formed from any transparent polymeric film.

A film will be selected which provides good photographic quality when viewing the image. Preferably, a film will be used which is resistant to yellowing. The first support is typically a transparent polyethylene terephthalate (PET) support.

The second support is preferably an opaque support such as polyethylene terephthalate (PET) containing an opacifying agent, paper or paper lined with film (polyethylene, polypropylene, polyester, etc.), or a combination thereof, or any multi-layer film or paper based structure. Preferably the opaque support is a polyethylene terephthalate support containing about 10% titanium dioxide which provides a bright white support. Generally these supports are commercially available. Typically each of the front and back supports has a thickness of about 2 to 4 mils.

The peripheral edges of the self-contained assembly may be sealed additionally by any other conventional means used to seal polymeric materials such as polyethylene terephthalate. For example, the edges of the films can be heat sealed together or they can sealed by any other technique.

In accordance with this embodiment of the invention, a full color imaging system is provided. Various photoinitiators can be selected for use in the present invention. These compounds absorb the exposure radiation and generate a free radical alone or in conjunction with a sensitizer. The imaging media can be exposed using lasers, light emitting diodes, liquid crystal displays or pencil light sources of appropriate wave lengths.

The photoprint of the present invention also includes a data storage medium. The data storage medium can be any mechanism capable of storing data and subsequently being read. In accordance with one embodiment of the invention, the data storage media comprises a magnetic layer disposed on the imaging medium. A magnetic layer may be in the form of a coating, laminate, a stripe or any other structure which provides the necessary data storage properties on the photoprint without interfering with the image on the photoprint. In accordance with one embodiment, the magnetic coating is clear and transparent to imaging light, such that the coating can be applied over the face or image side of the photoprint. Alternatively, the magnetic coating can be applied on the back of the photoprint, in which case the magnetic coating can be either transparent, translucent, or opaque. When a black, brown or other magnetic layer is applied to the backing, a white overcoat can be applied to provide a white backing without interfering with the writing and reading of information to and from the magnetic layer. In yet another embodiment, the magnetic coating on the backside can be over laminated with a white or opaque film using a pressure-sensitive adhesive. The magnetic film can also be laminated onto the back side of the imaging medium using a pressure-sensitive adhesive. In accordance with this aspect, the magnetic film can be either laminated as a stripe or applied over the entire back of the media. Furthermore, lamination of the magnetic film can occur either before or after imaging and magnetic encoding of the corresponding image information.

In accordance with one embodiment of the present invention, the magnetic layer is a transparent magnetic recording layer. The magnetic particles in the transparent magnetic layer can be ferromagnetic iron oxides, such as $\gamma$-$Fe_2 O_3$, $Fe_3 O_4$ $\gamma$-$Fe_2 O_3$ or $Fe_3 O_4$ with Co, Zn or other metals in solid solution or surface treated or ferromagnetic chromium dioxides, such as chromium oxide with metallic elements, for example Li, Na, Sn, Pb, Fe, Co, Ni, and Zn, or halogen atoms in solid solution. Ferromagnetic pigments with an oxide coating on their surface to improve their chemical stability or dispersability, as is commonly used in conventional magnetic recording, may also be used. In addition, magnetic oxides with a thicker layer of lower refractive index oxide or other material having a lower optical scattering cross-section as taught in U.S. Pat. Nos. 5,217,804 and 5,252,444, both of which are incorporated herein by reference, can be used. These are present in the transparent magnetic layer in the amount from about 1 to 10 weight percent based on the weight of the binder. The magnetic particles have a surface area greater than 30 m$^2$/gm and a coverage of from about $1\times10^{-11}$ mg/$\mu$m$^3$ to $1\times10^{-1}$ mg/$\mu$m$^3$. A dispersing agent, or wetting agent can be present to facilitate the dispersion of the magnetic particles. This helps to minimize the agglomeration of the magnetic particles. Useful dispersing agents include fatty acid amines and commercially available wetting agents such as Witco Emcol CC59 which is a quaternary amine available from Witco Chemical Corp. Rhodafac PE 510, Rhodafac RE 610, Rhodafac RE960, and Rhodafac LO529, which are phosphoric acid esters available from Rhone-Poulenc.

The polymer binder of the transparent magnetic layer may be any polymer having good abrasion resistance. For example, cellulose esters such as cellulose diacetates and triacetates, cellulose acetate propionate, cellulose acetate butyrate, cellulose nitrate, polyacrylates such as polymethyl methacrylate, polyphenylmethacrylate and copolymers with acrylic or methacrylic acid, or sulfonates, polyesters, polyurethanes, urea resins, melamine resins, urea-formaldehyde resins, polyacetals, polybutyrals, polyvinyl alcohol, epoxies and epoxy acrylates, phenoxy resins, polycarbonates, vinyl chloride-vinyl acetate copolymers, vinyl chloride-vinyl acetate-maleic acid polymers, vinyl chloride-vinylidene chloride copolymers, vinyl chloride-acrylonitrile copolymers, acrylic ester-acrylonitrile copolymers, acrylic ester-vinylidene chloride copolymers, methacrylic ester-styrene copolymers, butadiene-acrylonitrile copolymers, acrylonitrile-butadiene-acrylic or methacrylic acid copolymers, styrene-butadiene copolymers can be used as binders in the transparent magnetic layer. Cellulose ester derivatives, such as cellulose diacetates and triacetates, cellulose acetate propionate, cellulose nitrate, and polyacrylates such as polymethyl methacrylate, polyphenylmethacrylate and copolymers with acrylic or methacrylic acid are preferred.

The transparent and magnetic layer may also include abrasive particles, filler particles, coating aids and surfactants as needed and in amounts known in the art. Furthermore, viscosity modifiers can be present in the transparent and magnetic layer. Lubricants may either be incorporated into the transparent and magnetic layer or be applied as a separate layer. Solvents useful for coating the lubricant layer or the transparent magnetic layer include alcohols, ketones, chlorinated solvents, esters, water, hydrocarbons, ethers or mixtures thereof.

Image capture can be by any means typically used in photography or image capture. In accordance with one aspect of the invention, the image is acquired using a digital camera which can then be used to provide a digitized image with can be send directly to both the imaging media and the data storage medium. Transfer of the digitized image can occur sequentially or simultaneously. Accordingly, in this embodiment the digitized images on the imaging media and the data storage medium are identical and any copies generated from the digitized image on the data storage medium will be of comparable quality to the original image. Alternatively, a conventional photographic film could be utilized wherein a digitized image captured off the negative during processing can be used to generate the image on the imaging media as well as the digitized image stored in the data storage medium. Other methods for capturing an image, digitizing the image and transferring the digitized image to the image media and the data storage medium will be apparent to those skilled in the art.

Methods for writing and reading the digitized image to and from the data storage medium on the photoprinter are well known within the art and need not be described in detail. The magnetic reader can either be part of the imaging device or can be used as a stand-alone unit. As noted previously, the image forming process and the recording of digitized image information on the magnetic coating or data storage medium can be done either sequentially or simultaneously.

In accordance with another aspect of the present invention, the data supplied to the data storage medium corresponding to the image may comprise an identification code or pointer corresponding to the location of the image on the Internet, network, hard drive, compact disk or any other data storage medium. In accordance with this embodiment, the image may be retrieved and then stored to a hard drive, written to a CD or disk, or sent directly to a high-quality color printer after locating the corresponding image. The stored information on the data storage medium from the photoprint may be such that it directly takes the user to the location of the image or, retrieval and access of the image may involve additional steps such as verification and identification. Software programs can be modified as necessary to facilitate automation of the uploading and printing process.

In another embodiment of the present invention, the entire image file is magnetically encoded onto the image media. When the image media is to be scanned or copied for reproduction, the magnetically encoded information is read instead of scanning the picture file. This prevents a loss in image quality since the image is being generated from basically the same digital information. This information can then be converted to the appropriate imaging format such as ".GIF," ".JPG," ".PCX," ".BMP," ".TIF," etc. followed by printing of the image file using high-quality image output device or uploading of the image on to a storage media on a personal computer. The digital image may be compressed so that it can be recorded in a low-concentration magnetic medium thereby minimizing storage requirements. Compression can be by any of the standard compression algorithms used in the art.

Reproductions used in accordance with the present invention may be directly output to a printer for generating additional hard copies of the photographic print. Alternatively, other forms of the image presentation are also possible, such as displaying the image on a cathode ray tube, liquid crystal display, or a light emitting diode display for projecting visible image onto a tangible surface using one of these display devices.

Having described the invention in detail and by reference to preferred embodiments thereof, it will be apparent that modification in the variations without departing from the scope of the invention in the following claims.

What is claimed:

1. A method for reproducing an image from a photoprint comprising the steps of:
    a) providing a photoprint comprising an imaging media and a data storage medium;
    b) producing an image on an image side of said imaging media;
    c) encoding said data storage medium with data corresponding to said image;
    d) reading said data from said data storage medium corresponding to said image; and
    e) reproducing said image based on the data read from said data storage medium.

2. The method of claim 1 wherein said imaging media comprises a self-contained imaging media.

3. The method of claim 2 wherein said self-contained imaging media is a sealed, self-contained imaging assembly comprising:
    a first transparent polymeric film support;
    a second polymeric film support which may be opaque or transparent;
    an imaging layer disposed between said first transparent support and said second support, said imaging layer comprising a developer material and a plurality of photosensitive microcapsules, said photosensitive microcapsules including an internal phase containing a photosensitive composition and a color precursor wherein, upon image-wise exposing said photosensitive material and rupturing said microcapsules, said color precursor is image-wise released from the microcapsules to form a color image.

4. The method of claim 3 wherein said data storage medium comprises a magnetic layer.

5. The method of claim 4 wherein said magnetic layer is transparent.

6. The method of claim 5 wherein said transparent magnetic layer is disposed on said imaging side of said imaging media.

7. The method of claim 3 wherein said magnetic layer is disposed on a side opposite said imaging side of the imaging media.

8. The method of claim 7 wherein said magnetic layer comprises a magnetic stripe.

9. The method of claim 1 wherein said data corresponding to said image is a pointer to an Internet address wherein said Internet address contains an electronic version of said image.

10. The method of claim 1 wherein said data corresponding to said image comprises a digital version of said image.

11. The method of claim 1 wherein step (e) comprises generating photoprint reproductions by outputting said data to a printer.

12. A method for reproducing an image from a photoprint, the photoprint including a photosensitive imaging media and a magnetic storage layer, the method comprising the steps of:
    a) capturing an image in digital form;
    b) image-wise exposing said photosensitive media;
    c) developing said image-wise exposed media to produce a visible image;
    d) recording the digital image in the magnetic storage layer;
    e) reading the digital image in the magnetic storage layer; and
    f) outputting said digital image.

13. The method of claim 12 wherein said imaging media comprises a self-contained imaging media.

14. The method of claim 13 wherein said self-contained imaging media is a sealed, self-contained imaging assembly comprising:
    a first transparent polymeric film support;
    a second polymeric film support which may be opaque or transparent;
    an imaging layer disposed between said first transparent support and said second support, said imaging layer comprising a developer material and a plurality of photosensitive microcapsules, said photosensitive microcapsules including an internal phase containing a photosensitive composition and a color precursor wherein, upon image-wise exposing said photosensitive material and rupturing said microcapsules, said color precursor is image-wise released from the microcapsules to form a color image.

15. The method of claim 14 wherein said magnetic layer is transparent.

16. The method of claim 15 wherein said transparent magnetic layer is disposed on said imaging side of said imaging media.

17. The method of claim 13 wherein said magnetic layer is disposed on a side opposite said imaging side of the imaging media.

18. The method of claim 17 wherein said magnetic layer comprises a magnetic stripe.

19. The method of claim 12 wherein said steps of image-wise exposing the photosensitive media and recording the digital image in the magnetic storage layer occur simultaneously.

20. The method of claim 1 wherein said imaging media is a transfer type imaging system.

* * * * *